US006520112B2

(12) United States Patent
van der Lely et al.

(10) Patent No.: US 6,520,112 B2
(45) Date of Patent: Feb. 18, 2003

(54) METHOD OF AUTOMATICALLY MILKING ANIMALS AND A MILKING MACHINE SUITABLE FOR PERFORMING SAME

(76) Inventors: Alexander van der Lely, 44 Jan Witkampstraat, 3065 Na Rotterdam (NL); Maurice Jean François Marie Corten, 14, Bahnhofstrasse, CH-6340 Baar (CH)

( * ) Notice: Subject to any disclaimer, the term of this patent is extended or adjusted under 35 U.S.C. 154(b) by 0 days.

(21) Appl. No.: 09/935,546

(22) Filed: Aug. 24, 2001

(65) Prior Publication Data

US 2002/0000204 A1 Jan. 3, 2002

Related U.S. Application Data

(63) Continuation of application No. PCT/NL00/00868, filed on Nov. 28, 2000, now abandoned.

(30) Foreign Application Priority Data

Dec. 22, 1999 (NL) .............................................. 1013931

(51) Int. Cl.[7] .................................................. A01J 3/00
(52) U.S. Cl. ..................................... 119/14.02; 119/840
(58) Field of Search ........................... 119/14.02–14.03, 119/51.02, 51.11, 840–841, 842, 62, 63

(56) References Cited

U.S. PATENT DOCUMENTS

| 5,653,192 | A | * | 8/1997 | Sheen et al. | ............. | 119/51.02 |
| 5,673,647 | A | * | 10/1997 | Pratt | ........................ | 119/51.02 |
| 5,826,536 | A | * | 10/1998 | van der Lely et al. | .... | 119/14.02 |
| 6,095,086 | A | * | 8/2000 | Aurik et al. | ............. | 119/14.02 |
| 6,209,485 | B1 | * | 4/2001 | van der Lely et al. | .... | 119/14.02 |

FOREIGN PATENT DOCUMENTS

| EP | 0091892 | * 10/1983 |
| EP | 639327 | 8/1994 |
| EP | 957821 | 8/1994 |
| WO | WO 95/35028 | * 12/1995 |
| WO | WO 97/14297 | 4/1997 |
| WO | WO 98/26649 | 6/1998 |

* cited by examiner

*Primary Examiner*—Yvonne Abbott
(74) *Attorney, Agent, or Firm*—Penrose Lucas Albright

(57) ABSTRACT

A system to be employed in a automated method and apparatus for milking animals such as cows wherein the milking apparatus is computer controlled to apply and remove teat cups from the teats of the animals being milked. The apparatus includes an animal recognition system which is communication with the computer whereby it is determined whether or not an animal that approaches or enters a milking compartment will be milked. This determination depended on the number of animals that have been milked after the latest milking turn of an animal that has reported to a milking compartment to be milked. Unless the number of interim milkings exceeds a predetermined numerical value, that animal would not again be milked. The herd of animals to be milked are divided into groups based on their currently expected milk yields as stored in the computer. The currently expected milk yield which determines the predetermined numerical value for each group of animals is based on physical characteristics of each animal such as the stage of lactation, which, in turn, determines the group which the computer (or dairy farmer manually) places the animal involved. As the physical characteristics of each animal change it may be placed in a different group. Irrespective of the predetermined numerical value of milkings which must occur before the animals can again be milked, that value is the same for all animals in a group as long they remain in that group.

19 Claims, No Drawings

METHOD OF AUTOMATICALLY MILKING ANIMALS AND A MILKING MACHINE SUITABLE FOR PERFORMING SAME

RELATED APPLICATION

This is a Continuation of International Application No. PCT/NL00/00868, filed Nov. 28, 2000, now abandoned.

The invention relates to a method as claimed in the preamble of claim 1. The invention further relates to a milking machine which is suitable for performing said method.

Such a method is known from patent application EP-A-0 091 892. In order to prevent animals from being milked too frequently, at an animal's visit to the milking parlour, the time elapsed since its last milking is compared with a fixed minimum time interval. Thus it is decided whether or not the animal should be milked. This has the disadvantage that neither mutual differences between the animals to be milked nor changes occurring with an animal in the course of time are taken into account. From patent application WO-A-95/35028 it is known, when such a method is used, to define each time again the predetermined time for each animal. Said method has the disadvantage of being rather cumbersome.

The invention aims at improving such a method. According to the invention, this is achieved by the measures described in the characterizing part of claim 1. The invention is based on the insight that, by classifying the animals in groups with a predetermined time per group, specific conditions of the animals can be taken into account to a sufficient extent, without the method becoming too cumbersome and its application becoming too time-consuming for the user.

The invention will be explained in further detail with the aid of some exemplary embodiments.

The classification of the animals in groups is altered in the course of time; animals are classified from one group into another group on the basis of their current physical condition and/or their currently expected milk yield. Preferably, animal data concerning the physical condition and/or the expected milk yield of the animals are kept up to date in the course of time, it being repeatedly determined on the basis of the animal data which animals should be classified in which other groups, whereupon the relevant animals are each time classified in the relevant other groups.

In a preferred embodiment of the invention, the classification is stored in a computer in which animal data are stored and/or to which animal data can be supplied, which data are relevant to the expected milk yield of the animals. At least one time, e.g. at the initiation of the system, the classification can be manually inputted into the computer by a user. Alterations in the classification are also stored in the computer.

To enhance the ease of operation for the user, certain alterations in the classification on the basis of the animal data can be automatically carried out by the computer with the aid of a classification programme. In this manner the user need not adjust each time the classification himself.

The animals may be classified successively in various groups, for example on the basis of their lactation cycle, with the aid of the classification programme. The computer disposes of relevant data in relation to the lactation cycle of the animals, on the basis of which the classification programme classifies the relevant animals, when the latter have arrived at a certain point in the lactation cycle, in a group with a different predetermined minimum time between successive milkings. Thus it is achieved that the number of milkings per unit of time is always optimal for the animals during their entire lactation cycle.

Certain alterations in the classification are carried out manually by the user. The addition of new animals, for example, requires a manual alteration.

It is also possible to alter the predetermined time allotted to a group in the course of time, for example at a transition from pasture grazing to indoor feeding or at a sudden weather change.

Animals with which mastitis has been detected are temporarily classified in a group with a shorter predetermined time. This makes it possible for these animals to be milked more frequently.

Although groups containing only one animal are possible, the groups will contain in general more than one animal.

The predetermined time of a group can be chosen in a manner known per se. When, for example, cows should be milked three times per 24 hours, they are classified in a group with a predetermined interval of (a bit less than) eight hours. Depending on the desired number of milkings per 24 hours a predetermined interval is defined per group.

The values of the predetermined times can be chosen depending on the expected milk production per unit of time of the animals in the group. Said milk production depends on parameters such as e.g. the activity of movement of the animals (which can be measured i.a. with the aid of a pedometer known per se), the age of the animals, the intake of feed of the animals and/or the health of the animals' udder (which can be measured i.a. with the aid of means for analysing the milk). Also of great importance is the stage of lactation of the animals.

The classification in groups is not a classification wherein the animals are separated physically, but a theoretical classification "on paper", so that the groups can be stored in a computer which is connected to the animal identification system. In the computer also the points of time at which every animal is milked are kept up to date. When a cow goes to the milking parlour of the milking robot, the animal is recognized by the animal identification system. The computer compares the predetermined interval for the group to which the relevant animal belongs with the time that has elapsed since the last milking of the relevant animal. When at least the predetermined time has elapsed, the animal is milked.

What is claimed is:

1. A method of automatically milking animals wherein the animals are allowed to move about freely in a milking area and visit a milking compartment which includes a milking robot and an animal identification means, said method comprising dividing said animals into at least two groups whereby the animals of each said group have a common characteristic, at least one of said groups having at least two animals, assigning each animal to be milked in said milking compartment to one of said groups based on said animal having a characteristic which is common to such group, identifying an animal and the group to which said animal has been assigned at a visit of such animal to said milking compartment, and milking such identified animal after at least a predetermined number of milkings of other animals has occurred since said identified animal was last milked wherein said predetermined number of milkings is the same for all animals which have been assigned to the same group as such animal.

2. A method in accordance with claim 1 wherein the animals assigned to each of said groups are changed over the course of time based on changes in the characteristics of each said animal over the course of time.

3. A method in accordance with claim 2 wherein the common characteristic of the animals of each said group comprises their physical condition.

4. A method in accordance with claim 3 comprising measuring at least daily the physical conditions of each said animal and reassigning said animal from one said group to another said group based upon changes in its physical conditions.

5. A method in accordance with claim 1 wherein the characteristic used to assign animals to said groups comprises their currently expected milk yield.

6. A method in accordance with claim 1 comprising measuring each said animal's milk yield daily and reassigning said animal from one said group to another said group when warranted based on the last measured milk yield of each said animal.

7. A method in accordance with claim 1 comprising storing data on each said animal which relates to said common characteristic of each said group of animals in a computer.

8. A method in accordance with claim 7 comprising measuring the milk yield of each of said animal daily, and storing data relevant to said milk yield of each said animal in said computer.

9. A method in accordance with claim 1 wherein the group to which each said animal is initially assigned is manually imputed into a computer.

10. A method in accordance with claim 1 comprising storing any change in said characteristics in each of said animals in a computer.

11. A method in accordance with claim 1 comprising determining by a computer algorithm the said group in which each of said animals is assigned based on the physical characteristics of each said animal.

12. A method in accordance with claim 11 wherein said algorithm assigns each said animal to a said group based on the stage of lactation of the relevant animal.

13. A method in accordance with claim 11 comprising manually changing said algorithm for assigning any of said animals to a said group of said animals which is based on such animal's expected milk yield.

14. A method in accordance with claim 1 comprising changing said predetermined number of milkings between milking of the animals of one of said groups over the course of time.

15. A method in accordance with claim 1 comprising assigning an animal with mastitis temporarily to a group wherein said predetermined number of milkings between milking of such animal is shorter than it is in the group from which such animal has been temporarily removed.

16. A herd of animals to be milked by an automated milking system which comprises a plurality of different classifications for said animals in said herd, the animals in each said classification having a common parameter of a group of parameters consisting of lactation, expected milk yield, activity of movement, age, and health, and control means for controlling the minimum number of milkings of other animals which is permitted between milkings of each of said animals depending on the classification to which each such animal is assigned wherein said minimum number of milkings is the same for all of said animals in the same classification.

17. A herd of animals in accordance with claim 16 comprising a computer for determining on a continuous basis the classification to which each of said animals is currently assigned.

18. An apparatus for the automated milking of animals wherein the animals are allowed to move about freely in a milking area and to visit a milking compartment which is associated with said area, said milking compartment comprising a milking robot, an animal identification means, and a computer comprising an algorithm for classifying said animals into a plurality of groups wherein each said animal in the group to which it is assigned has a characteristic which is the same for all said animals in such group and calculating when a predetermined number of milkings of other animals has occurred since each of said animals was last milked before it can be again milked, said predetermined number of milkings being the same for all of said animals in said group, at least one of said groups comprising at least two of said animals.

19. An apparatus in accordance with claim 18 wherein the animals in each of said groups have common characteristics consisting of one of the following characteristics: being in the same stage of lactation period, having about the same expected milk yield, being the same age; and being in about the same state of health.

* * * * *